Patented Apr. 10, 1951

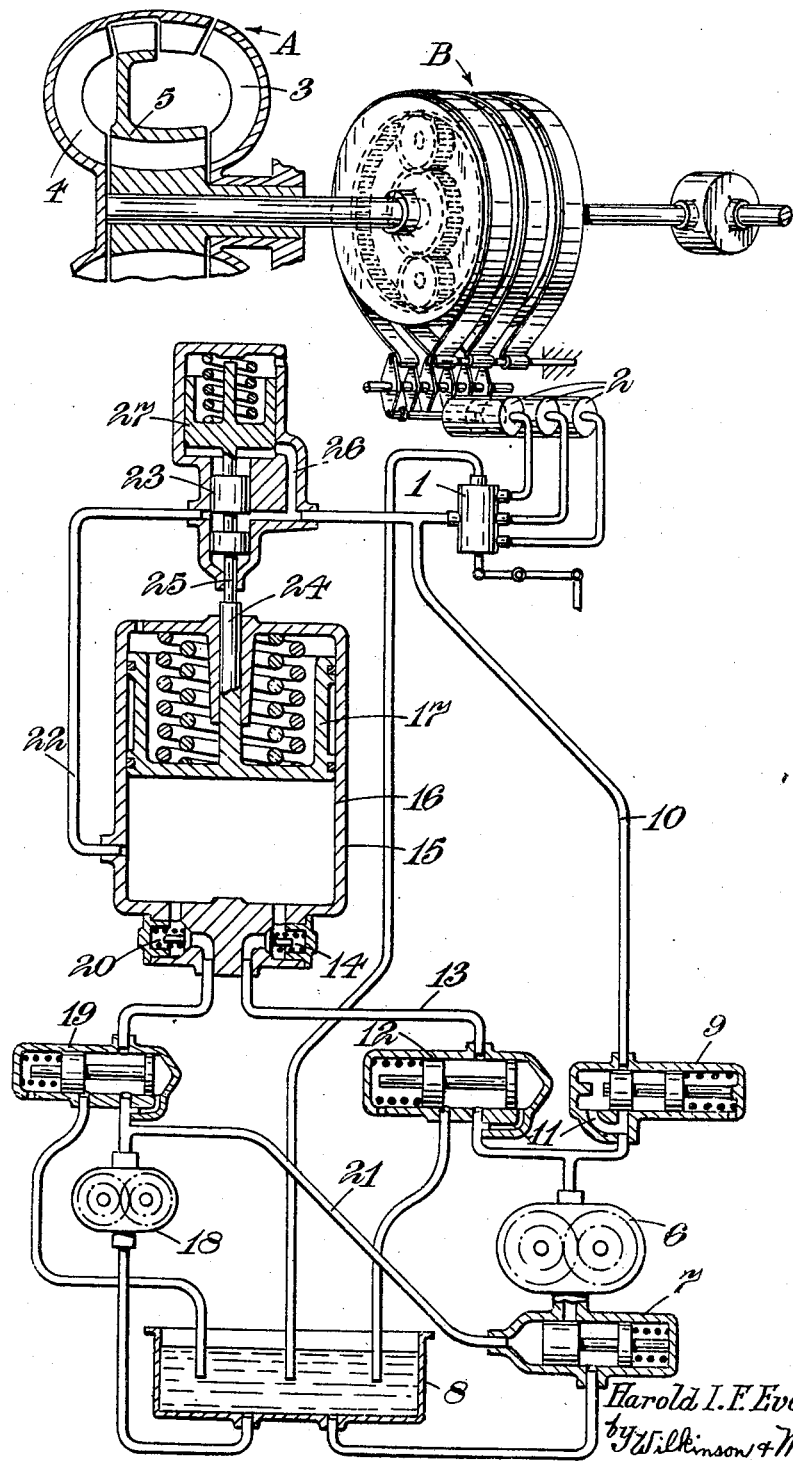

2,548,208

UNITED STATES PATENT OFFICE 2,548,208

HYDRAULIC POWER TRANSMISSION SYSTEM

Harold Ivan Frederick Evernden, Hazelwood, Duffield, near Derby, England, assignor to Rolls-Royce Limited, Derby, England, a British company Application September 24, 1946, Serial No. 698,987
In Great Britain October 20, 1944

Section 1, Public Law 690, August 8, 1946
Patent expires October 20, 1964

5 Claims. (Cl. 74—732)

This invention relates to hydraulic power transmission systems of the kind comprising a hydraulic coupling, or a hydraulic torque-converter, used in conjunction with a change-speed gear and hydraulically-operated means for controlling the change-speed gear. In order to cater for all conditions of motion of the prime mover and of the load, which may for example be an engine and a vehicle respectively, it has hitherto been customary to provide two oil pumps driven respectively by the engine and by the motion of the vehicle; this arrangement ensured that under any circumstances in which a gear-change might be required, adequate oil pressure would be available.

Such an arrangement, however, is not always possible, or convenient and according to the present invention, a power-transmission system of the kind described comprises a pump driven by the output shaft of the turbine runner of the hydraulic unit of large enough capacity to be capable of providing and maintaining the desired operating pressure at idling speeds of the engine said pump being connected through a spring-loaded non-return valve directly to an accumulator provided with a spring-loaded piston to enable the necessary pressure for operating the change-speed gear to be developed therein and with a valve isolating the accumulator from said gear until the necessary pressure is developed. The other pump driven by the motion of the vehicle, from any convenient part of the transmission gear near the final drive, can be of very much smaller capacity and for brevity these two pumps are hereinafter designated the "large" and "small" pumps respectively.

The small pump is also arranged to supply the accumulator, and according to another feature of the invention a spring-loaded valve is provided on the suction side of the large pump together with means for closing said valve when the small pump is in operation and developing sufficient pressure.

Conveniently the spring-loaded piston of the accumulator is provided with a piston-rod arranged to open the isolating valve when the desired pressure has been attained; according to another feature of the invention when the valve has been opened, the pressure is applied to the valve so as to maintain it open against the action of a spring, so long as the necessary pressure is available.

A specific embodiment of the present invention will now be described by way of example with reference to the accompanying drawing which shows in diagrammatic form a power transmission system in accordance with the present invention as applied to a motor vehicle.

The transmission system comprises a torque-converter generally indicated by the reference numeral A and a change-speed gear B disposed between the torque-converter and the transmission shaft of the vehicle. The change-speed gear B is controlled by a valve box 1 and operated by a number of hydraulic cylinders 2 the hydraulic cylinders being each coupled to a brake associated with each reduction ratio of the change-speed gear.

The torque-converter comprises an impeller 3 and a turbine element 4 arranged in a closed circuit with a reaction member 5 interposed therein. The function of the reaction member 5 is to change the direction of the working fluid and is therefore subjected to a torque which is normally taken by the stationary casing of the torque-converter.

The large capacity pump 6 referred to above is driven by the turbine runner 4 and draws its supply of oil through a suction cut-off valve 7 from a reservoir 8. The suction cut-off valve 7 is in the form of a piston valve which is spring-controlled towards its open position but is adapted to be moved to its closed position against the action of its spring by oil pressure as hereinafter described.

Pump 6 is connected through a non-return valve 9 by means of pipe line 10 with the valve box 1 so that on starting from rest the pump 6 delivers oil thereto and ensures that it is filled. This filling may take place at a comparatively low pressure determined by the non-return valve 9 but when the pump develops a higher pressure it automatically closes said valve. For this purpose the valve 9 takes the form of a piston valve which is spring-controlled towards its open position. The valve is also provided with an additional inlet port 11 so that the delivery pressure of the pump 6 may be applied to the piston of valve 9 to move it to its closed position against the action of the spring of valve 9 when the pressure of pump 6 is sufficiently high. The pump 6 also delivers oil through a relief valve 12 (which is set to a higher pressure) to pipe line 13, non-return valve 14 and so to an accumulator 15. The accumulator 15 is constituted by a cylinder 16 having a spring-controlled piston 17 so that pressure is developed on the oil in the accumulator, this pressure being determined by the relief valve 12 and being sufficiently high to operate the change-speed controlling mechanism through the hydraulic cylinders 2.

The small pump 18 is driven from a convenient member in the transmission system beyond the change-speed gear, for example, from the back axle of the vehicle and delivers oil through a relief valve 19 and a non-return valve 20 to the accumulator 15.

When the engine is first started up pump 6 fills the system with oil, if necessary, and also fills the accumulator 15 under pressure and if the vehicle is in motion the supply is maintained by the pump 18. In order to avoid waste of power which would heat the oil if the pump 6 were continuously in operation with a source of pressure supply connected thereto, the pressure delivered by the pump 18 is applied by pipe 21 to the suction cutoff valve 7 so that the piston thereof is urged against the action of its associated spring towards its closed position, thereby rendering pump 6 inoperative. It will be observed from the drawing that pipe line 21 is connected to the delivery side of the pump 18 between the latter and the relief valve 19.

In order to ensure that the pressure of the oil in the accumulator is built up, the outlet pipe 22 connecting the accumulator with the valve box 1 and the hydraulic cylinders 2 is provided with a spring-controlled valve generally indicated by the reference numeral 23. Valve 23 normally stops communication between pipe 22 and the valve box 1 but it is arranged to be opened when the pressure in the accumulator attains a predetermined value. This is effected by a piston rod 24 carried by the piston 17 of the accumulator 15 which is adapted directly to engage the stem 25 of valve 23 and move it to its open position when the piston 17 approaches the upper end of the cylinder 16 and has compressed its associated spring to a certain extent. On the outlet side of the valve 23 there is provided a branch connection 26 which places the delivery side of the valve in communication with a spring loaded piston 27 which is directly coupled to the valve 23. The spring-loading on the piston 27 normally holds the valve 23 closed but the arrangement is that when said valve has been opened as described by the accumulator piston 17 the pressure within the accumulator is rendered available on the outlet side of the valve 23 and is therefore applied to piston 27 through branch 26. Said pressure therefore holds the piston 27 in its upper position against the action of its spring so that while the pressure in the accumulator 15 is sufficient to balance the spring load on the piston 27 valve 23 is held open and this is so even although the accumulator piston 17 moves inwardly into its cylinder and thereby becomes disengaged from valve 23.

The operation of the mechanism will now be briefly described.

On starting from rest, the valve 9 being open, pump 6 delivers by pipe line 10 to the valve box 1 and builds up a pressure therein until a low pressure value of about 10 lbs. per square inch is obtained. When this pressure is reached the pressure fluid passing through the port 11 and applied to the piston of valve 9 has attained a value such that the piston is moved to its closed position and the valve 9 thereupon closes. The pump 6 continues to deliver pressure fluid through the relief valve 12 and pipe line 13 and the non-return valve 14 to the accumulator 15 until the pressure therein attains the desired working pressure determined by the relief valve 12. When this pressure is reached the piston 17 actuates valve 23 to open it and place the accumulator in communication by way of pipe 22 with the valve box 1. As described above the valve 23 is held in this open position so long as pressure in the accumulator 15 is sufficient to balance the spring load on piston 27.

If a gear shift is required, the valve box 1 is set to permit the oil under pressure in the accumulator 15 to pass to the appropriate hydraulic cylinder 2 so that the associated brake band of the change-speed gear is applied. At the same time the turbine element 4 of the torque-converter A has been reduced in speed or brought to rest (depending upon whether the engine throttle opening is sufficient to overcome the resistance of the particular gear engaged) in which case pump 6, driven by turbine element 4, will have a reduced or zero output. The accumulator 15 however continues to maintain the operating pressure to the hydraulic cylinder 2 and after the vehicle is in motion the pump 18 being driven thereby, maintains the necessary supply to keep the accumulator filled, pressure being continually maintained as a result in the cylinder 16.

It is to be understood that the invention is not limited to the precise construction and arrangement of parts just described, for various modifications may be made, or alternative constructions used for effecting the desired functions of the various parts.

I claim:

1. A power transmission system comprising a hydraulic torque-transmitting mechanism having an output shaft, a change-speed gear between the output shaft of said hydraulic torque-transmitting mechanism and a load shaft to which torque is transmitted by said system, hydraulically operated control means for said change-speed gear, a pump driven by said output shaft, to supply operating liquid for said control means, an accumulator for said operating liquid, a connection between said pump and said accumulator, a non-return valve in said connection to prevent flow from the accumulator to the pump, a second connection between said pump and said control means, a pressure-operated cut-off valve in said second connection operated by the discharge pressure of said pump, a third connection between said accumulator and said control means and a pressure-operated isolating valve in said third connection operated by the pressure in said accumulator.

2. A power transmission system according to claim 1 wherein said accumulator comprises a cylinder containing a spring-loaded piston, and an operating connection is provided between said piston and said isolating valve.

3. A power transmission system according to claim 1 wherein said pressure operated isolating valve is opened when the pressure in said accumulator attains a first selected value and is closed when the pressure in said accumulator falls to a second selected value less than said first selected value.

4. A power transmission system comprising a hydraulic torque-transmitting mechanism having an output shaft, a change-speed gear between the output shaft of said hydraulic torque-transmitting mechanism and a load shaft to which torque is transmitted by said system, hydraulically operated control means for said change-speed gear, a first pump, driven by said output shaft, to supply operating liquid for said control means, an accumulator for said operating liquid, a connection between said first pump and said accumulator, a non-return valve in said connection to prevent flow from the accumulator to the first pump, a second connection between said first pump and said control means, a pressure-operated cut-off valve in said second connection operated by the discharge pressure of said first pump, a third connection between said accumulator and said control means, a pressure-operated isolating valve in said third connection operated by the pressure in said accumulator, a second pump driven by said load shaft, a fourth connection between said second pump and said accumulator, a second non-return valve in said fourth connection to prevent flow from said accumulator to said second pump, a supply connection to the inlet of said first pump, and a pressure operated cut-off valve in said supply connection operated by the discharge pressure of said second pump.

5. A power transmission system according to claim 3 wherein said accumulator comprises a cylinder containing a spring loaded piston and further comprising a one-way drive transmission between said spring-loaded piston and said isolating valve rendered operative to open said isolating valve as a result of movement of said spring loaded piston on increase of pressure in said cylinder above a first selected value, a second piston connected for movement with said isolating valve, a second cylinder for said second piston, a branch connection between said third connection and said second cylinder whereby pressure in said third connection loads said second piston to open said isolating valve, and a loading device loading said isolating valve to close, which loading device is dimensioned so that the load it applies to said isolating valve is balanced by the load applied thereto by the second piston when the pressure in said third connection has a second selected value less than said first selected value.

HAROLD IVAN FREDERICK EVERNDEN.

REFERENCES CITED

The following references are of record in the file of this patent:

UNITED STATES PATENTS

| Number | Name | Date |
| --- | --- | --- |
| 2,072,379 | Patterson | Mar. 2, 1937 |
| 2,182,621 | Dodge | Dec. 5, 1939 |
| 2,332,593 | Nutt et al. | Oct. 26, 1943 |
| 2,343,955 | Cotterman | Mar. 14, 1944 |